Dec. 28, 1965  L. SCHAFER  3,225,710
PASTRY CONVOLUTING DEVICE
Filed April 15, 1964  2 Sheets-Sheet 1
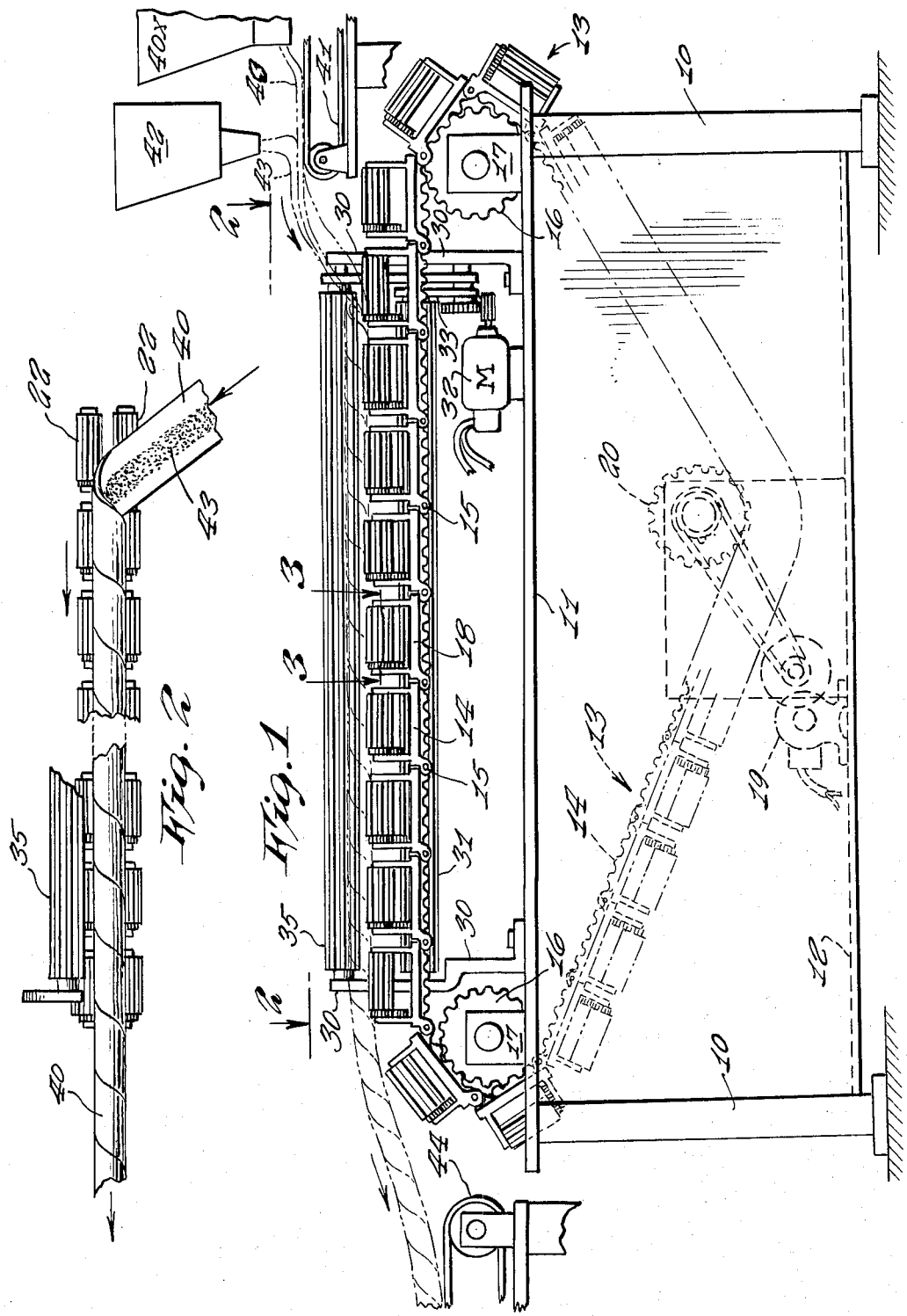

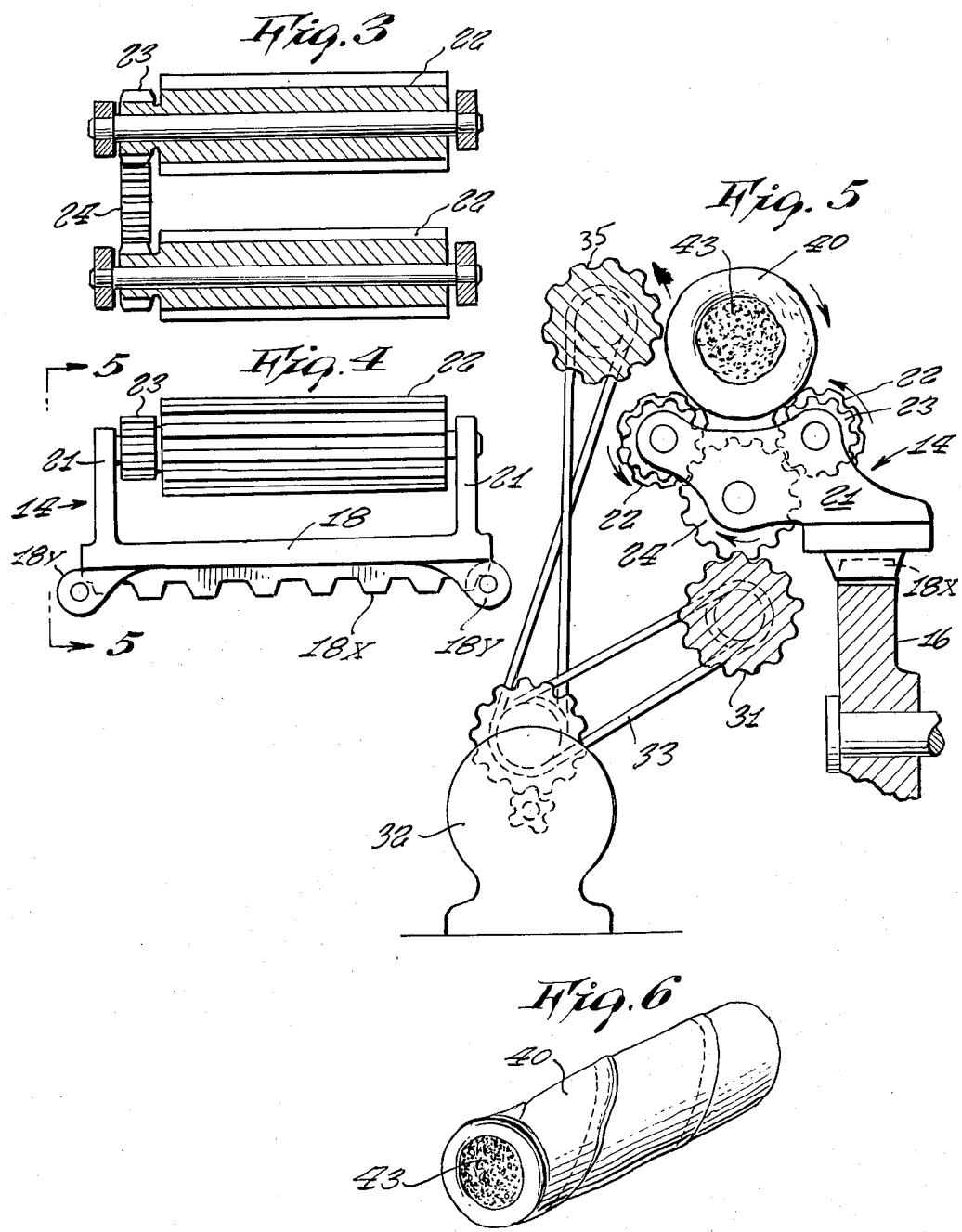

3,225,710
PASTRY CONVOLUTING DEVICE
Leonhard Schafer, 113 E. 125th St., New York, N.Y.
Filed Apr. 15, 1964, Ser. No. 359,938
5 Claims. (Cl. 107—9)

This invention relates to a device for twisting a ribbon of pastry having jam thereon into a continuous convoluted roll.

The preparation of Danish pasty is essentially a hand operation and hence an expensive operation from the viewpoint of the labor involved.

It is an object of this invention to provide a device that will eliminate hand labor in the preparation of Danish pastry.

It is another object to provide a device that is continuous in operation.

These and other objects of this invention will become apparent upon the following disclosure of an illustrative embodiment shown in the accompanying drawings and in which:

FIG. 1 is a side view of the device showing the conveyor formed of rack or roller units.

FIG. 2 is a top plan view taken on line 2—2 of FIG. 1 and showing the manner of convoluting an obliquely fed strip of pastry having jam thereon, FIG. 3 is a view taken substantially on line 3—3 of FIG. 1 and showing the horizontal fluted roller arrangement of the paired rollers and the manner of actuating them, FIG. 4 is a side view of an individual roller element of which the conveyor is composed, FIG. 5 is an end view taken substantially on line 5—5 of FIG. 4, and FIG. 6 is a perspective view of a portion of the finished pastry roll which is subsequently cut up into small individual pasty size units as needed.

Turning to FIG. 1 a strong metal frame 10 is provided with a top platform 11 and a bottom platform 12.

A conveyor 13 made up of individual roller units 14 is linked together by link pins 15. These units 14 are shown in FIGS. 3 to 5 in greater detail.

A pair of sprocket wheels 16 are journaled into support plates 17 which are secured to the opposed ends of the top platform 11.

The units 14 are each provided with suitably grooved horizontal rack portions 18 for engagement with the sprocket wheels 16.

The conveyor 13 is powered at a predetermined speed by motor 19 through a conventional reduction gear box and sprocket gear drive wheel 20 secured to bottom platform 12.

As shown in FIGS. 3, 4 and 5, each unit 14 comprises an integral preferably cast metal frame having extended end portions 21 at each end, integral with the base rack portion 18 having rack teeth 18X thereon. The unit 14 has a pair of suitably fluted horizontally disposed rollers 22, each having an integral gear end 23 and secured in the opposed end portions 21.

An actuating gear 24 is mated to the gears 23 of the respective rollers 22 and secured in the front end portion 21 of a frame unit 14 (FIG. 5).

The rack 18 of the unit 14 is provided with apertured portions 18Y at each end into which the pins 15 are secured.

As shown in FIG. 1, the top platform 11 is provided with a pair of opposed end stanchions 30. A longitudinal gear 31 is disposed between and in these opposed stanchions 30. This long gear 31 is actuated by motor 32 and belt drive 33 (FIG. 5). The gear 31 actuates all the units 14 horizontally disposed thereupon as they move forward. The direction of rotation of the rollers 22 is shown by means of arrows in FIG. 5.

As shown in FIG. 1, the stanchions 30 also support a fluted guide or return roller 35 which keeps the convoluted pastry in the trough formed between the pair of suitably spaced-apart rollers 22, since the rollers 22 tend to push the convoluted product out of the trough between the rollers.

A smooth slippery surfaced stationary plate (not shown) may be used in lieu of the return roller 35 since it also functions to prevent the finished convoluted product from being propelled out of the trough by returning the same into said trough.

The feed of the pastry strip 40 (FIG. 1) from the pastry former 40X is made by a conventional conveyor 41, to the jam dispenser 42 which dispenses jam 43 thereon. The conveyor is disposed at a suitably oblique angle so that an oblique feed of the pastry strip is made upon the suitably spaced-apart two rollers 22 of a unit 14 as engagement is made. An exit conveyor 44 is provided for the finished product which resembles a rope and is relatively rigid since the convolutes thereof suitably overlap one another.

In the operation of this device each of the moving units 14 are moved horizontally (FIG. 1) and engage the long gear 31 during their entire horizontal travel from the rear to the front of the device. Thus the rollers carry the pastry strip 40 and simultaneously convolute it.

The finished product on roller 44 is cut into individual lengths suitable for immediate baking or the lengths may be of several feet and stored in a refrigerator for future cutting up and baking.

This invention is illustrated by means of an embodiment having a single conveyor made from a plurality of linked double roller units, said units having a centrally disposed actuating gear engaging said rollers, said actuating gear being disposed upon a longitudinal motivated gear. In this illustration the weight of the unit is in part disposed upon the longitudinal gear.

Clearly, the double roller units may be provided with a pair of opposed spaced-apart rack teeth and disposed upon spaced-apart sprocket wheels for more even distribution of the weight of the units.

This invention is illustrated by a single embodiment but it is not to be limited to this embodiment as it is of greater scope.

I claim:

1. A device for continuously convoluting a strip of pastry dough having jam disposed centrally thereon comprising a frame having a top horizontal platform; a pair of opposed stanchions secured to said platform; a longitudinal motivated gear supported by said stanchions; a sprocket driven conveyor belt comprising a plurality of rack units linked together, each of said rack units having a rack to engage said sprocket, a pair of suitably spaced-apart fluted rollers and actuating gear means engaging said rollers and engaging said longitudinal gear whereby when said strip is disposed obliquely upon and between said rollers it is carried forward by said rollers while being convoluted by the rotation of said rollers.

2. The device of claim 1 wherein each of said rack units comprise an integral frame having a bottom rack having apertured ends and having opposed end walls whereon a pair of said rollers and said actuating gear means is supported, and link pins linking through said apertures in the ends of the rack to secure the units into said conveyor.

3. The device of claim 2 in combination with means secured to said stanchions for retaining the convoluted pastry in the trough formed between the fluted rollers.

4. The device of claim 3 wherein said retaining means comprises a motivated fluted roller.

5. The device of claim 1 in combination with conveyor means for continuously feeding a flat strip of pastry with jam thereon at an oblique angle onto said conveyor belt.

References Cited by the Examiner

UNITED STATES PATENTS

| Re. 22,399 | 12/1943 | Fonken | 107—9 |
| 1,792,443 | 2/1931 | Peters | 107—9 |
| 2,337,539 | 12/1943 | Buechek | 107—9 |
| 2,352,617 | 7/1944 | Cohen et al. | 107—54 |
| 2,456,372 | 12/1948 | Buechek | 107—54 |

WALTER A. SCHEEL, *Primary Examiner.*

JOSEPH SHEA, *Assistant Examiner.*